May 15, 1962   J. E. RAIDEL   3,034,804
TRAILER COUPLER
Filed Oct. 5, 1960   3 Sheets-Sheet 1
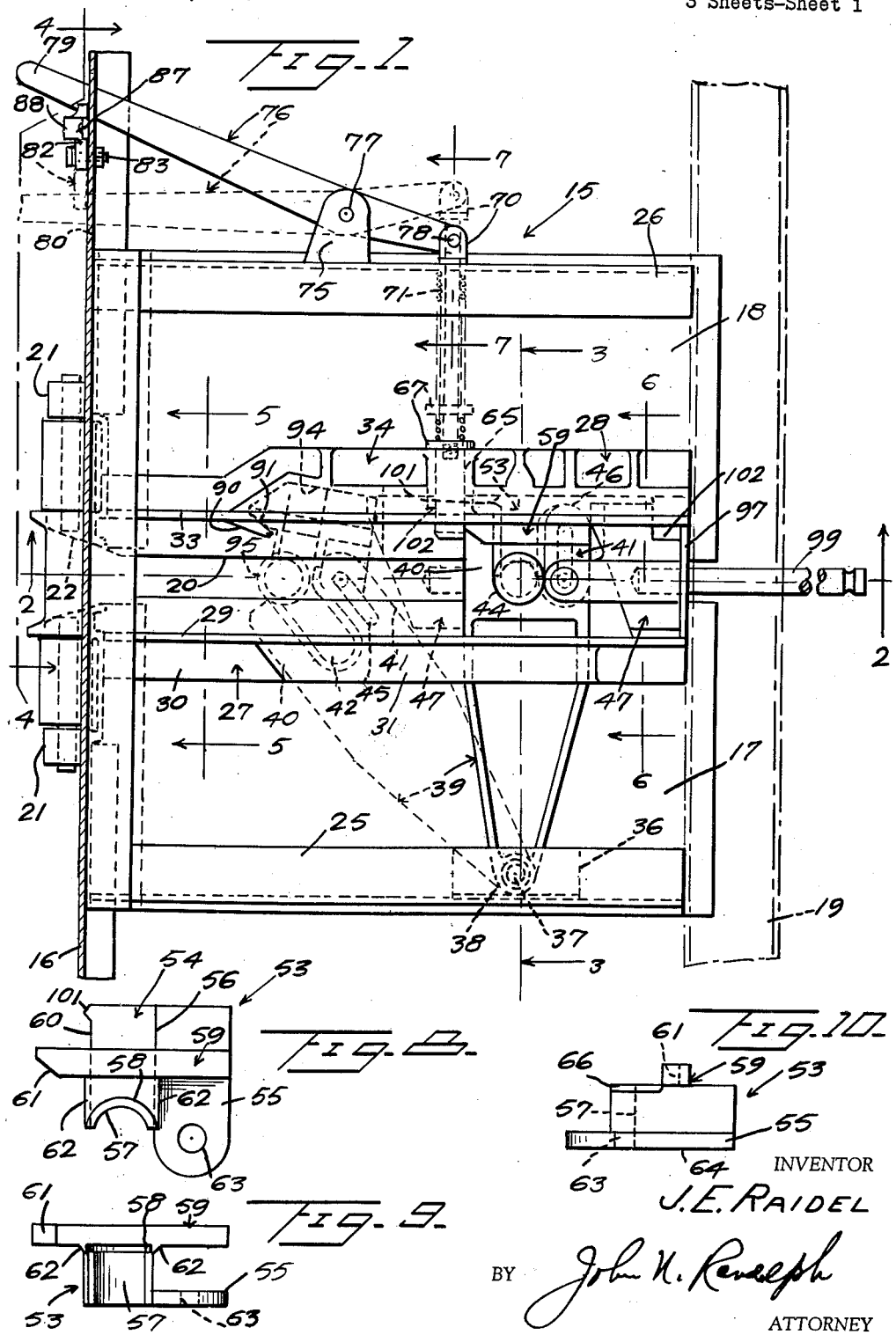
INVENTOR
J. E. RAIDEL
BY John H. Randolph
ATTORNEY

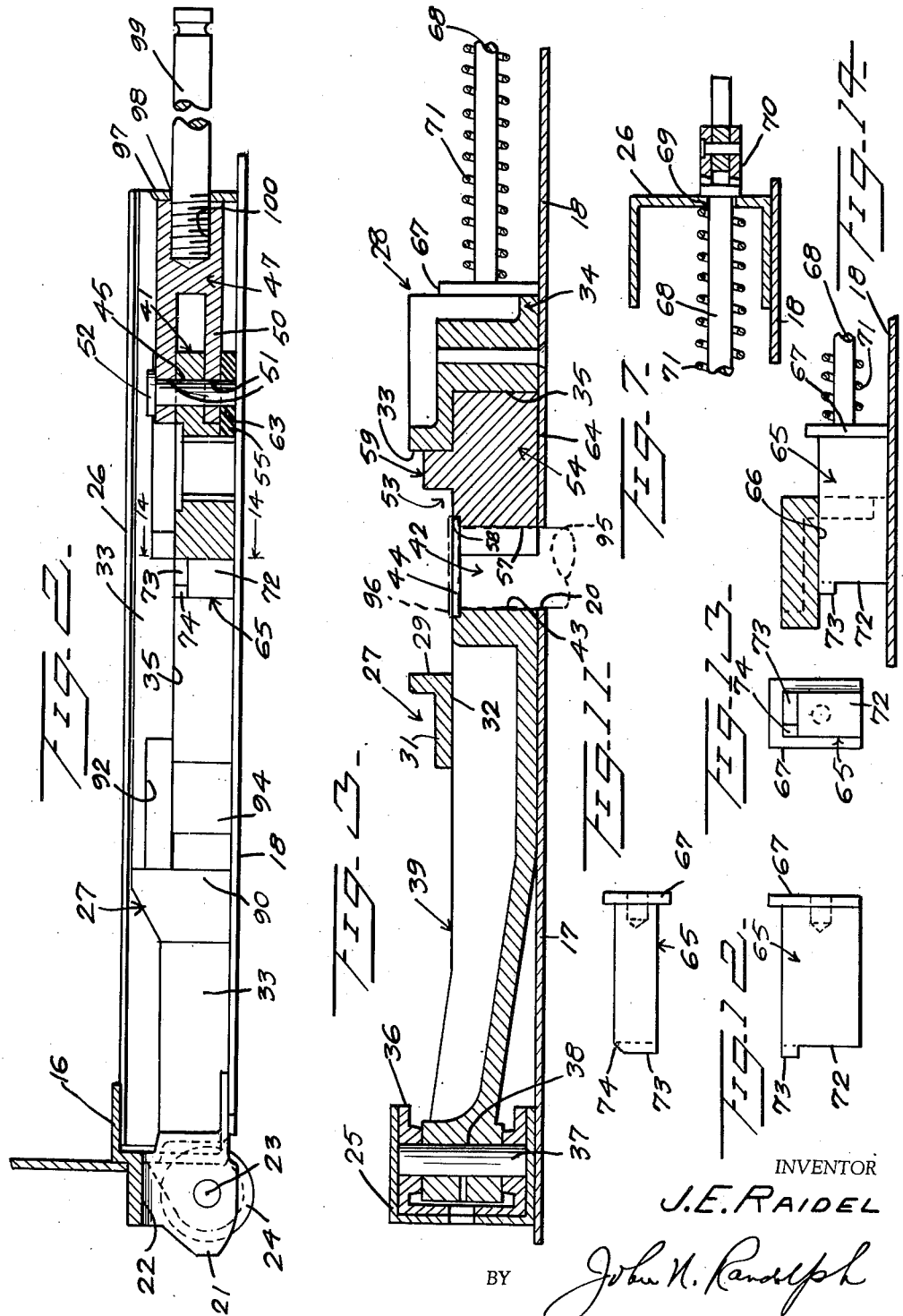

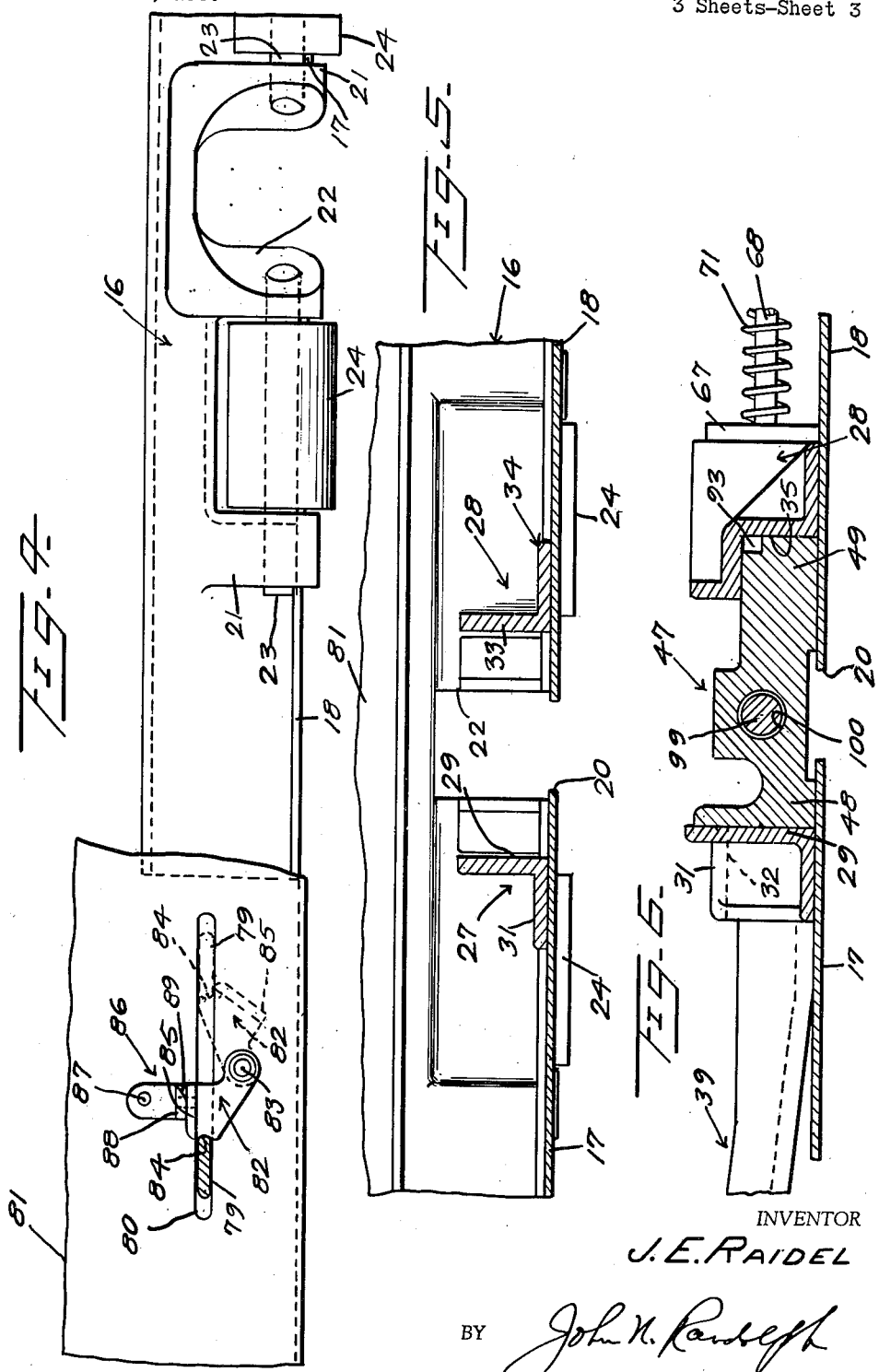

United States Patent Office 3,034,804
Patented May 15, 1962

3,034,804
TRAILER COUPLER
John E. Raidel, 15002 Dunton Drive, Whittier, Calif.
Filed Oct. 5, 1960, Ser. No. 60,736
9 Claims. (Cl. 280—434)

This invention relates to a novel coupler mounted in the front end of a trailer platform, midway of its side edges, for receiving the kingpin of a tractor fifth wheel to automatically couple the trailer to the tractor as the tractor fifth wheel is backed under the coupler.

More particularly, it is an object of the present invention to provide a coupler including a novel locking unit capable of being manually set in one position to allow the tractor fifth wheel kingpin to be received in the coupler and for automatically locking the kingpin therein; and which locking unit can be manually set in said aforementioned position to permit automatic uncoupling of the tractor from the trailer by a forward movement of the tractor.

Still another object of the invention is to provide a coupler including a swingably mounted arm having a notch for receiving the kingpin as it is moved rearwardly into the coupler, and which arm carries a latching member which is swingable relative thereto for confining the kingpin in said arm as the kingpin moves rearwardly to a fully coupled position.

Various other objects and advantages of the invention will hereinafter become more fully apparent from the following description of the drawings, illustrating a presently preferred embodiment thereof, and wherein:

FIGURE 1 is a top plan view, partly in horizontal section of the coupler;

FIGURE 2 is an enlarged fragmentary longitudinal sectional view, taken substantially along a plane as indicated by the line 2—2 of FIGURE 1;

FIGURE 3 is an enlarged fragmentary cross sectional view, taken substantially along a plane as indicated by the line 3—3 of FIGURE 1;

FIGURE 4 is a fragmentary cross sectional view, on an enlarged scale, primarily in front elevation, taken substantially along the line 4—4 of FIGURE 1;

FIGURE 5 is an enlarged fragmentary cross sectional view, taken substantially along a plane as indicated by the line 5—5 of FIGURE 1;

FIGURE 6 is an enlarged fragmentary cross sectional view, taken substantially along a plane as indicated by the line 6—6 of FIGURE 1;

FIGURE 7 is an enlarged fragmentary cross sectional view, taken substantially along a plane as indicated by the line 7—7 of FIGURE 1;

FIGURE 8 is a top plan view of one element of the coupler;

FIGURE 9 is a side elevational view thereof looking upwardly toward the coupler element as seen in FIGURE 8;

FIGURE 10 is a rear end elevational view of said element looking from right to left of FIGURES 8 and 9;

FIGURE 11 is a plan view of another element of the coupler;

FIGURE 12 is a side elevational view thereof;

FIGURE 13 is an end elevational view looking from left to right of FIGURES 11 and 12, and FIGURE 14 is an enlarged fragmentary sectional view taken substantially along a plane as indicated by the line 14—14 of FIGURE 2.

Referring more specifically to the drawings, the trailer coupler in its entirety and comprising the invention is designated generally 15 and includes a front trailer platform member 16 of channel shaped cross section, as seen in FIGURE 2, the channel of which opens rearwardly. The forward ends of two fifth wheel plates 17 and 18 are secured in any conventional manner, as by welding, to the underside of the front cross member 16, and the rear ends of said plates 17 and 18 are similarly secured to the underside of a cross member 19 of the trailer platform. The plates 17 and 18 are flat and are disposed midway of the ends of the cross members 16 and 19 and thus, midway of the side edges of the trailer platform, not otherwise shown. The adjacent longitudinal edges of the plates 17 and 18 are disposed in spaced apart parallel relation to one another to form therebetween a kingpin receiving slot 20. While two separate plates 17 and 18 have been shown, it will be readily understood that a single plate could be substituted for the two plates and the slot 20 formed in said single plate.

As seen in FIGURES 1, 2 and 4, the front cross member 16 is formed on its forward side with forwardly extending roller shaft housings 21 which straddle a downwardly opening arch 22. The arch 22 forms a kingpin receiving opening which aligns with the slot 20, as seen in FIGURE 1. A shaft 23 is supported by each of the housings 21, and a roller 24 is journaled on each shaft 23. The rollers 24 straddle the kingpin receiving opening 22 and extend downwardly to below the level of the fiifth wheel plates 17 and 18.

A member 25, of channel shaped construction, extends along the upper side of the plate 17 near its outer edge, and a similar channel shaped member 26 is disposed along the outer edge of the upper side of the plate 18. The channel members 25 and 26 open toward one another and are secured in any conventional manner, as by welding, to the plates 17 and 18, respectively, and to the cross members 16 and 19.

A side rail 27 is disposed along the upper side of the plate 17 and a side rail 28 is disposed along the upper side of the plate 18. Said side rails may likewise be secured in any conventional manner, as by welding, to the plates 17 and 18 and the cross members 16 and 19. The side rails 27 and 28 are disposed substantially parallel to the slot 20 and are spaced laterally outward therefrom. The side rail 27 includes a vertical inner flange 29 and an outer bottom flange 30. The bottom flange 30 is arched intermediate of its ends, as seen at 31, and the vertical flange 29 is recessed to conform with the arch 31 to define an elongated slot 32 through said side rail 27, as seen in FIGURE 3.

The side rail 28 includes a vertical inner flange 33 and a horizontal outer flange 34. The flanges 33 and 34 are recessed from adjacent their forward ends to their rear ends to provide a cahnnel 35 which opens inwardly and toward the rail 27, as seen in FIGURE 3, and above which a part of the vertical flange 33 is disposed.

As seen in FIGURE 3, an inwardly opening channel shaped housing member 36 is secured in the channel member 25, in any conventional manner, as by welding, and has a hinge pin 37 extending vertically therethrough and loosely through a vertical eye 38 formed in one end of a carrier arm 39, and which eye 38 fits turnably in the housing 36. The arm 39 rests swingably on the plate 1 and extends under the arch 31 and loosely through the opening 32 of the side rail 27, for swinging movement in said opening 32 between its full and dotted line positions of FIGURE 1. The carrier arm 39 has a bifurcated inner end including a forward furcation 40 and a rear furcation 41 forming a deep notch 42. The notch 42 has a semicircular inner end 43 and is enlarged slightly at its top, as seen at 44. The rear furcation 41 is provided with a longitudinally extending slot 45 and has a rounded substantially semi-circular distal end 46. The furcation 41, as seen in FIGURE 2, is upwardly offset from the plane of the underside of the furcation 40.

A guide block 47 is slidably disposed between the side rails 27 and 28, behind the carrier arm furcation 41, and has one side edge portion 48 which slidably bears on the plate 17 and against the vertical rail surface 29, and an opposite side edge portion 49 which bears on the fifth wheel plate 18 and which slidably engages in the recess 35 of the rail 28. The guide block 47 has a forwardly extending fork or bifurcation 50 including upper and lower furcations which straddle the rear furcation 41, as seen in FIGURE 2, and which have openings 51 which align with one another and with the slot 45 to receive a headed pivot pin 52 which extends downwardly therethrough, for pivotally connecting the carrier arm 39 to the guide block 47.

A sliding latch, designated generally 53, and best illustrated in FIGURES 8, 9 and 10, includes a body portion 54 which extends lengthwise of the latch and which has a bottom flange 55 projecting laterally from the lower portion of the rear side wall 56 thereof. The inner end of the body 54 has an arcuate recess 57 extending from top to bottom thereof, the curvature of which corresponds to the curvature of the inner notch end 43 and which is enlarged, as seen at 58, at its upper end. A bar or rib member 59 is formed integral with and extends across the upper surface of the body member 54 and has a rear end portion which extends across the bottom flange 55 and a front end which protrudes from the front wall 60 of the body 54. Said front end of the bar or rib 59 is beveled as seen at 61 on the side thereof which is located nearest the vertical groove 57. The bar 59 is spaced from the groove 57 and the portion of the upper surface of the body member 54, which is disposed between the bar 59 and groove 57, has narrow top flanges 62 projecting outwardly from the rear wall 56 and front wall 60. The bottom flange 55 extends inwardly beyond the vertical groove 57 and the inner end thereof is provided with an opening 63. The underside 64 of the sliding latch 53 is substantially flat and rests slidably on the fifth wheel plate 18 and the portion of the body 54 and bottom flange 55, which is located outwardly of the bar 59, or to the right thereof as seen in FIGURE 10, engages in the recess or channel 35, as best seen in FIGURE 3. When the coupling is in a locked position as shown in full lines in FIGURE 1 and in FIGURE 3, the outer side of the rib or bar 59 bears flush against the vertical rail surface 33. The apertured inner end of the bottom flange 55 extends under the bifurcated portion 50 and the furcation 41, as seen in FIGURE 2, and the lower end of the pin 52 engages in the opening 63 for pivotally connecting the sliding latch 53 to the arm 39 and the guide block 47.

A locking bolt 65 of rectangular cross section, having a vertical height greater than its horizontal width, rests slidably upon the plate 18 and extends slidably through an opening 66 which is formed in a part of the portion 34 of the side rail 28 and which extends laterally therethrough. The bolt 65 extends to a height corresponding to the height of the channel 35, so that the height thereof corresponds to the height of the body portion 54 of the sliding latch 53 and also to the height of the side portion 49 of the guide block 47. The bolt 65 has a head 67, preferably formed integral with its outer end, which extends laterally from opposite sides of the bolt and upwardly therefrom, and which is disposed on the outer side of the guide portion 34. A rod 68 is secured in and extends outwardly from the head 67 loosely through an opening 69 in the channel member 26. A clevis 70 is secured to the outer end of the rod 68 and is disposed on the outer side of the channel member 26. A compression spring 71 is loosely disposed on the rod 68 and bears against the channel 26 and head 67 for urging the bolt 65 inwardly through the opening 66 to its fully projected locked position, as seen in full lines in FIGURE 1 and as seen in FIGURES 3 and 6. The front face 72 of the bolt 65 is flat and vertically disposed except for the upper end thereof which is provided with an outwardly projecting rib 73 one end of which is beveled as seen at 74. The beveled end 74 is disposed at the end of the rib located nearest the forward end of the slot 20, as best seen in FIGURE 2.

A bracket 75 is secured to and extends outwardly from the channel member 26. A hand lever 76 is pivotally connected at 77, near one end thereof, to the bracket 75, to swing in substantially a horizontal plane, and has a shorter end which engages loosely in the clevis 70 and is pivotally connected thereto by a pivot pin 78. The handle end 79 of the lever 76 extends forwardly through an elongated horizontal slot 80 in a portion 81 of the front cross member 16, as best seen in FIGURE 4. A latch member 82 is pivotally mounted at one end thereof by a pivot pin 83 to the forward side of the portion 81, beneath and substantially intermediate of the ends of the slot 80, and is provided with a notched portion 84, which is disposed remote from its pivot 83, and a substantially flat free end portion 85 which is disposed at an angle to the plane of the notch 84. A keeper member 86 is swingably mounted on the forward side of the portion 81 by a pivot pin 87, above the slot 80, and has an outwardly extending bottom flange 88, one end of which is beveled on its underside, as seen at 89. The latch 83 in its full line position of FIGURE 4 abuts against the keeper flange 88 and receives an edge of the lever handle 79 in its notch 84 for locking the coupling 15 in a coupled position, as seen in full lines in FIGURE 1 and in FIGURE 2, with the locking bolt 65 fully projected, or in the same position of the parts the coupling 15 may be locked in an uncoupled position, as seen in dotted lines in FIGURE 1, to prevent movement of the parts to a coupled position until the locking bolt 65 is manually retracted to an automatic or "duty" position, as seen in FIGURE 14. This is accomplished by swinging the keeper 86 upwardly in a clockwise direction, as seen in FIGURE 4, so that the latch 82 can then be swung clockwise to and beyond its dotted line position of FIGURE 4. The lever handle 79 is then moved to the left in the slot 80 to beyond its dotted line position, and the latch 82 is then swung upwardly to position the notch 84 across the slot 80 to engage the other edge of the handle 79 for latching the lever 76 in its dotted line, automatic or duty position of FIGURES 1 and 4, with the locking bolt 65 in its position of FIGURE 14 and its dotted line position of FIGURE 1, retracted relative to its full line position of FIGURE 1 and its position of FIGURES 2, 3 and 6, for a purpose which will hereinafter become apparent.

As seen in FIGURE 1, the vertical flange 33 has an inward and rearwardly extending projection 90 provided with an inner face defining a cam surface 91 which faces rearwardly. The flange 33 has a cutaway portion extending rearwardly from the projection 90 defining a recess 92 in the flange 33 and a deepened recessed portion 94, formed in the forward end of the recess or channel 35, as best illustrated in FIGURE 2.

Assuming that the locking bolt 65 has been retracted and that the arm 39 has been swung forwardly or counterclockwise from its full line position of FIGURE 1, toward its dotted line position, as said arm 39 swings forwardly the sliding latch slides forwardly therewith and the guide block 47 also slides forwardly. During this forward swinging movement of the arm 39 the slotted furcation 41 slides outwardly of the pin 52 which is maintained in a position axially of the slot 20 by the guide block 47, so that the notch 42 swings away from the arcuate face 57 of the sliding latch. As the bar 59 approaches the projection 90, its cam surface 61 strikes the cam surface 91 to cause the sliding latch to swing clockwise, as seen in FIGURE 1 away from the notch 42. During this clockwise swinging movement of the sliding latch 53, the bar 59 swings into the recess 92 of the vertical flange 33, and the outer end of the body 54 swings into the recessed forward portion 94 of the channel 35, as seen in dotted lines in FIGURE 1, so that the recessed face 57 and the furcation 40 are then disposed at opposite sides of the slot 20 with the forward edge of the recessed surface 57 clearing one side of the slot 20 and the furcation 40 clearing the other side thereof.

Assuming now that the lever 76 is latched in its automatic or "duty" position as illustrated in dotted lines in FIGURE 1, a tractor, not shown, to be hitched to a trailer equipped with the coupling 15 is backed with the tractor fifth wheel in alignment with said coupling. As the tractor fifth wheel approaches the coupling 15 and in correct alignment therewith, the rollers 24 will ride onto the fifth wheel plate of the tractor fifth wheel and elevate the coupling 15 and the forward end of the tractor several inches. The upwardly projecting tractor fifth wheel kingpin, shown at 95 in dotted lines, will be guided by the forwardly flared arch shaped entrance passage 22 into the slot 20 and will move rearwardly in said slot, as the tractor is backed, until it reaches its position as shown in FIGURE 1 in which a part of the pin 95 is in engagement with the arcuate surface 57. As the kingpin 95 moves further to the rear it will strike a part of the rounded end 46 of the furcation 41 to initiate swinging movement of the carrier arm 39 in a clockwise direction, as seen in FIGURE 1, from its dotted line position. As the arm 39 swings clockwise or rearwardly, the guide block 47 and sliding latch 53 will move rearwardly with said arm. The cam surface 61 of the sliding latch will initially move out of engagement with the cam surface 91, after which the outer side of the bar 59 will contact the flange 33, rearwardly of the recess 92 and by a camming engagement therewith will cause the latch 53 to swing slightly in a counterclockwise direction relative to the arm 39 for positioning the bar 59 parallel to said flange 33. As the sliding latch 53 thereafter slides rearwardly with the rearwardly swinging arm 39, the rearwardly traveling kingpin 95 will enter the notch 42, and the slot 45 will allow the pin 52 to slide relative to the furcation 41 so that the furcations 40 and 41 can assume positions straddling the kingpin 95 and the body portion 54.

As the sliding latch 53 reaches the locking bolt 65, which is latched in its position as seen in FIGURE 14, the outer edge of the rear wall 56 of the body 54 will strike the cam surface 74 for displacing the locking bolt 65 outwardly a sufficient distance to permit the sliding latch 53 to pass said locking bolt. When the sliding latch 53 strikes the cam surface 74, the handle 79 is in its dotted line position of FIGURE 4, held by the latch 82, which is in its dotted line position of this view. As the locking bolt 65 is displaced outwardly of the opening 66 the lever handle 79 will be swung to the right permitting the latch 82 to swing downwardly by gravity. Consequently, after the sliding latch 53 moves rearwardly past the locking bolt 65, the spring 71 will project the locking bolt inwardly in front of the sliding latch 53 and to its full line position of FIGURES 1, 2 and 3. In this position, the forward edge of the furcation 40 will bear against the rear side of the sliding latch 65 for locking the coupling 15 in its coupled position, as seen in full lines in FIGURE 1 and in FIGURES 2 and 3. In this position the kingpin will fit snugly between the opposed arcuate surfaces 43 and 57, as seen in FIGURE 3, and the head 96 of the kingpin will engage the recesses 44 and 58. As seen in FIGURE 6, the guide block 47 has a recess 93 in the upper corner of its side portion 49 to accommodate the rib 73 as said block 47 moves rearwardly ahead of the arm 39 and sliding latch 53, and while the locking bolt 65 is latched in its automatic position of FIGURE 14.

After the parts have reached their completely coupled position as seen in full lines in FIGURE 1, the swinging latch 82 is swung manually to its full line position of FIGURE 4 to prevent the lever 76 from being swung counterclockwise about its pivot 77, as seen in FIGURE 1, until the latch 82 is manually released, as previously described, to thus positively prevent an accidental uncoupling of the kingpin 95.

A plate 97 extends between and is secured to the rear ends of the side rails 27 and 28 and has an opening 98 therein through which a rod 99 loosely extends. The forward end of the rod 99 threadedly engages a rearwardly opening socket 100 of the guide block 47. Thus, the rod 99 moves forwardly and rearwardly with the guide block 47. The rod 99 may be connected to suitable means, not shown, for raising and lowering front supporting wheels, not shown, of the trailer, automatically as the trailer is coupled to and uncoupled from the kingpin 95.

To uncouple the kingpin 95, the lever 76 is returned to its "open lock" position as shown in dotted lines in FIGURE 4, in which position the locking bolt is disposed in its automatic or "duty" position of FIGURE 14. With the parts thus disposed, the tractor may move forward relative to the trailer to cause the kingpin 95 to slide forwardly in the slot 20. The arm 39 guide block 47 and sliding latch 53 will move forwardly with the kingpin 95 from their full line, toward their dotted line positions of FIGURE 1. The front wall 60 at its outer end is provided with a forward projection forming a cam surface 101 which strikes the rear end of the projection 73, after a slight forward movement of the slide latch 53, for displacing the locking bolt 65 outwardly to allow the body 54 to pass the locking bolt 65, and so that the handle 79 will be swung to the right from its dotted line position of FIGURE 4 to disengage the swinging latch member 82 which then swings downwardly by gravity from its dotted line position. After the body 54 has cleared the locking bolt 65, the spring 71 will project said locking bolt inwardly and back to its position of FIGURE 14 in which the bottom portion of the front face 72 will bear against the outer edge of the flange 55 and thereafter against the vertical wall of the side portion 49, as the sliding latch 53 and guide block 47 move forwardly toward their dotted line positions. The notch 93 will accommodate the projection 73 as the guide block 47 moves forwardly past the locking bolt 65, in the same manner as it did during rearward travel of said guide block, as previously described. As the parts 39, 53 and 47 reach their forwardmost positions, the sliding latch 53 will be cammed away from the furcation 40 by its cam surface 61 engaging the cam surface 91, as previously described, and as shown in dotted lines in FIGURE 1, so that the kingpin 95 will be completely disengaged from the arm 39 and slide latch 53 to move on through the forward end of the slot 20 and the passage 22, completely out of engagement with the coupling 15. A rear corner of the side portion 49 of the guide block 47 is cutaway to provide a notch 102 which aligns with the locking bolt 65, in the forwardmost position of the guide block 47, and into which the locking bolt 65 is projected by its spring 71, as seen in dotted lines in FIGURE 1, to lock the coupling in an open position. Thus, the lever 76 must be manually actuated to return it to its "open lock" dotted line position of FIGURES 1 and 4 before the kingpin 95 can again be automatically coupled.

Various modifications and changes are contemplated and may be resorted to, without departing from the function or scope of the invention as hereinafter defined by the appended claims.

I claim as my invention:

1. A trailer coupling comprising a frame adapted to be secured in a forward end of a trailer platform and having a longitudinally extending forwardly opening slot adapted to receive a tractor fifth wheel kingpin, an arm swingably supported by said frame, said arm having a free end provided with an outwardly opening notch adapted to receive the kingpin, said notch being swingably movable across said slot, a slide latch mounted for sliding movement in said frame, means slidably and pivotally connecting said slide latch to the free end of said arm, cam means for camming said slide latch away from the arm notch when said arm and latch are moved to forwardmost positions for exposing the notch to receive the kingpin therein or to release the kingpin therefrom, cam means for rocking the latch toward the arm notch as the latch is moved rearwardly with the rearwardly swinging arm for confining the kingpin within said notch, and a spring projected locking bolt slidably mounted in the frame and crosswise thereof and engaging against a forward edge of the free end of said arm for locking the arm in a rearmost position crosswise of the frame and in transverse alignment with said slide latch.

2. A trailer coupling as in claim 1, and a manually actuated means for releasably latching the locking bolt in a partially retracted position, said locking bolt having a cam portion engaged by the rearwardly moving slide latch for displacing the locking bolt to a fully retracted position for releasing said manually actuated means so that the locking bolt is moved to a fully projected position when the slide latch and arm have moved rearwardly past said bolt.

3. A trailer coupling as in claim 1, and a guide block slidably mounted in said frame, said guide block being disposed behind the free end of said arm and connected thereto by said pivot means, said frame including side rails disposed parallel to said slot in which the guide block is slidably confined for maintaining said pivot means in alignment with the axis of the slot.

4. A trailer coupling as in claim 3, manually actuated means for releasably latching said locking bolt in a partially retracted position to permit movement of the arm, slide latch and guide block forwardly or rearwardly past said locking bolt, and cam portions on the slide latch and locking bolt for displacing the locking bolt to a fully retracted position to release said manually actuated latching means during travel of the slide latch in either direction across the locking bolt for automatic movement of the locking bolt to a fully projected position either in front of the free end of said arm or behind a portion of the guide block for locking the coupling in either a fully closed or a fully opened position, respectively.

5. A trailer coupling having a bottom fifth wheel plate provided with a longitudinally extending forwardly opening slot adapted to receive a tractor fifth wheel kingpin, an elongated arm, means engaging one end of the arm for swingably mounting the arm on said plate to one side of said slot, said arm having an opposite free end swingably movable across said slot, said free end of the arm having an outwardly opening notch in which the kingpin is adapted to be received when said arm is swung to a forwardmost position of its swinging movement relative to said slot, and a locking bolt slidably mounted on said plate for movement crosswise of said slot, said locking bolt being disposed on the opposite side of the slot from the pivoted end of said arm to extend across the forward edge of the free end of the arm when the locking bolt is in a projected position and said arm is disposed in a rearmost coupling position crosswise of said slot.

6. A trailer coupling as in claim 5, said notch being of a depth such that the kingpin is disposed in the inner end of the notch when said arm is retained by the locking bolt in a coupling position.

7. A trailer coupling as in claim 6, means for releasably setting said locking bolt in a partially retracted position to permit said arm to swing rearwardly to a coupling position, means for automatically releasing the locking bolt as said arm reaches a coupling position, and spring means for projecting the locking bolt to a locking position in front of the free end of said arm.

8. A trailer coupling as in claim 7, said means for releasing the locking bolt from a partially retracted position comprising a slide latch supported by said plate and pivotally and slidably connected to the free end of said arm behind said notch for closing the outer end of the notch as the arm swings rearwardly to a coupling position and for exposing the outer end of the notch as the arm swings forwardly to an uncoupling position.

9. A trailer coupling comprising a frame adapted to be secured to a forward end of a trailer and having a longitudinally extending forwardly opening slot adapted to receive a tractor fifth wheel kingpin, an arm swingably supported by said frame having a free end provided with an outwardly opening notch disposed for swinging movement across said slot and adapted to receive the kingpin, a slide latch, means slidably and pivotally connecting the slide latch to the free end of said arm, guide means carried by said frame in which said slide latch is slidably received and guided for directing the slide latch away from the notch as the arm is swung to a forwardmost position to expose the notch for receiving or releasing the kingpin, said slide latch being rocked toward the notch for closing the notch to confine the kingpin therein as said arm is swung rearwardly, and a locking member carried by said frame for locking the arm in a rearmost position of its swinging movement.

References Cited in the file of this patent

UNITED STATES PATENTS 2,120,509    Reid _____ June 14, 1938
2,417,904    Bennett _____ Mar. 25, 1947